(12) United States Patent
Hagiwara et al.

(10) Patent No.: US 6,675,198 B1
(45) Date of Patent: Jan. 6, 2004

(54) NETWORK AND NETWORK TERMINAL

(75) Inventors: Hidekazu Hagiwara, Aichi-ken (JP); Kenji Tatsuo, Aichi-ken (JP)

(73) Assignee: Takaoka Electric Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/559,182

(22) Filed: Apr. 27, 2000

(30) Foreign Application Priority Data

May 26, 1999  (JP) .......................................... 11-146531

(51) Int. Cl.[7] ................................................ G06F 15/16
(52) U.S. Cl. .................... 709/208; 709/216; 709/220; 709/221; 709/222; 709/224
(58) Field of Search ................. 709/201, 203, 709/208, 204, 216, 220, 221, 222, 223, 224, 227

(56) References Cited

U.S. PATENT DOCUMENTS

| | | | | |
|---|---|---|---|---|
| 5,815,652 A | * | 9/1998 | Ote et al. ...................... 714/31 |
| 5,949,974 A | * | 9/1999 | Ewing et al. ................ 709/202 |
| 5,961,586 A | * | 10/1999 | Pedersen .................... 709/201 |
| 5,968,116 A | * | 10/1999 | Day et al. ................... 709/202 |
| 5,978,833 A | * | 11/1999 | Pashley et al. ............. 709/200 |
| 6,330,690 B1 | * | 12/2001 | Nouri et al. .................. 714/23 |
| 6,330,715 B1 | * | 12/2001 | Razzaghe-Ashyrafi ...... 717/171 |
| 6,366,957 B1 | * | 4/2002 | Na ............................. 709/229 |
| 6,381,700 B1 | * | 4/2002 | Yoshida ..................... 713/201 |
| 6,425,000 B1 | * | 7/2002 | Carmello et al. ........... 709/217 |
| 6,493,824 B1 | * | 12/2002 | Novoa et al. ............... 713/162 |

* cited by examiner

Primary Examiner—Saleh Najjar
(74) Attorney, Agent, or Firm—Kanesaka & Takeuchi

(57) ABSTRACT

A network linking together one or more servers and a plurality of network terminals which function on a basic software set downloaded from a server and are uses for remotely operating the application software stored in the servers, configured so that a switch-off command can be sent from a server to all network terminal simultaneously and each of said network terminals, and, in response to the switch-off command, checks whether the basic software set being used on the network terminal requires disconnection from the corresponding server prior to switch-off in order to prevent problems caused by switch-off and then switches off the power after disconnection if the basic software set requires disconnection, or otherwise switches off the power immediately without disconnection.

5 Claims, 6 Drawing Sheets

NETWORK AND NETWORK TERMINAL

BACKGROUND OF THE INVENTION

1. Field of the Invention

The present invention relates to a network linking one or more servers and a plurality of network terminals which function on a basic software set downloaded from the server and are used for remotely operating the application software stored in the servers, and also relates to a network terminal used for the network.

2. Discussion of the Background

Network terminals, such as a dumb terminal, WBT (Windows-Based Terminal) and NC (Network Computer), which are linked to servers in a network, function on a basic software set downloaded from a server, and are used to remotely operate the application software on the servers and to perform various types of processing on the server side, are conventionally used.

These conventional network terminals do not have application software stored in them, and have only a basic software set, such as an OS (Operating System) or display software, minimum software needed at each network terminal to use the application software in a server by remote operation, stored in the memory. The basic software set necessary for this purpose differs according to the OS of the server in which application software is used. Therefore, a basic software set specific to each server is stored in each server and downloaded from the server in which the application software is stored each time when switching occurs on the network terminal or the basic software set is replaced with another.

Conventional network terminals thus require neither a hard-disk drive nor a high-speed CPU, and hence a network can be formed at a low cost. Moreover, the application software used on a network can be updated by simply updating the application software stored in the servers, and hence the management of a network system becomes easier. For these reasons, the TCO (Total Cost of Ownership) of a network can be substantially reduced.

However, in the above-described conventional network, network terminals are individually switched off by operating the power switch provided on each network terminal. Therefore, there is a problem that this takes much time and is very troublesome to switch off all terminals on a network when a large number of network terminals are connected to that network.

An object of the present invention is to make it possible to easily switch off a plurality of network terminals in a network without causing problems on the servers.

SUMMARY OF THE INVENTION

The present invention provides a network linking together one or more servers and a plurality of network terminals which function on a basic software set downloaded from a server and are used for remotely operating the application software stored in the servers, wherein each server can send a switch-off command to all network terminal simultaneously, and after receiving the switch-off command, each of the network terminals checks whether the basic software set being used on the network terminal requires disconnection from the corresponding server prior to switch-off in order to prevent problems caused by the switch-off and then switches off the power after disconnection if the basic software set requires disconnection, or otherwise switches off the power immediately without disconnection.

The present invention also provides a network terminal connected to one or more servers via a network which functions on a basic software set downloaded from the server, is used to remotely operate the application software on the server, and is capable of receiving a switch-off command from the server, comprising a switch-off means for checking whether the basic software set currently used on the network terminal requires disconnection from the corresponding server prior to switch-off in order to prevent problems caused by switch-off and then switch-off the power after disconnection if the basic software set requires disconnection, or otherwise switch-off the power immediately without disconnection in response to a switch-off command sent from a server.

According to the present invention, it becomes possible to switch off all network terminals simultaneously from a server without causing problems if some or all network terminals are using the basic software sets that can cause problems if the power is switched off without the disconnection before switch-off. Further, it is also possible to quickly switch off the network terminals which are not using the basic software sets that require the disconnection.

This network terminal preferably has a memory capable of storing a plurality of basic software sets downloaded from the servers and retaining the basic software sets when the network terminal is switched off, and loader software originally stored in the memory and performing functions including receiving a plurality of basic software sets downloaded from the servers and storing the basic software sets in the memory, and running one of the basic software sets stored in the memory determined according to a predetermined method or selected by a predetermined selection operation.

The memory for storing the basic software sets downloaded from the servers is preferably flash memory.

By these configuration, it becomes possible to quickly and easily provide each network terminal with a necessary basic software set without downloading it each time the network terminal is started or using the application software in a different server.

DETAILED DESCRIPTION OF PREFERRED EMBODIMENTS

Figure 1:
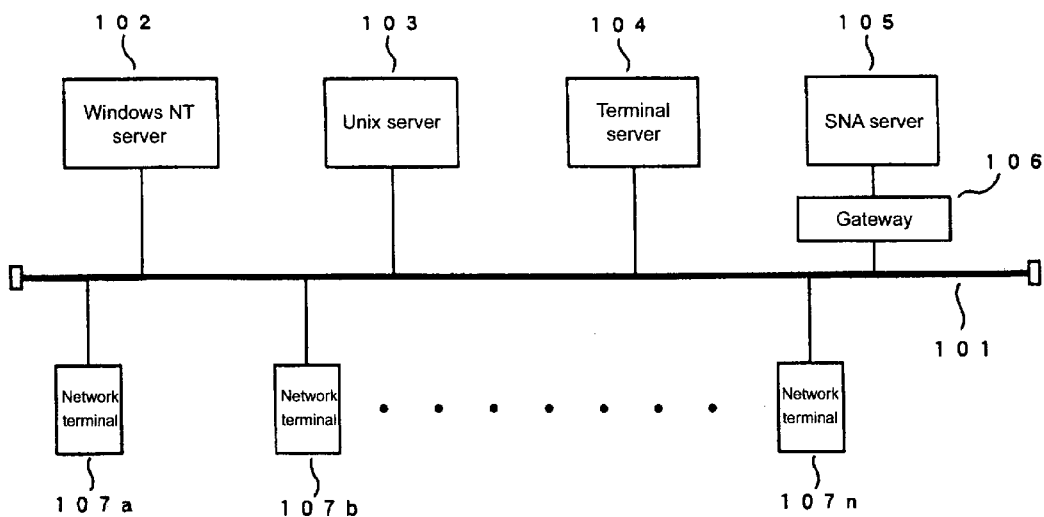
FIG. 1 shows the entire configuration of a network according to an embodiment of the present invention.

A network according to an embodiment of the present invention is described below referring to the drawings. In the drawings, identical parts are assigned like reference numerals.

FIG. 1 shows the entire configuration of a network as an embodiment of the present invention. This network is a LAN (Local Area Network) using Ethernet.

In FIG. 1, a Windows NT server 102, Unix server 103, and Terminal server 104 are connected to a transmission medium 101. An SNA (Systems Network Architecture) server 105 is connected to the transmission medium 101 via a gateway 106. In addition, a plurality of network terminals 107a to 107n, each being an embodiment of an embodiment of the network terminal of the present invention is connected to the transmission medium 101.

Each server has its own OS, application software such as a word processing program, database program and other software for business use and a basic software set corresponding to the server's own OS, for downloading to the network terminals that need the basic software set to remotely operate the application software in the server, stored on its hard disk (not shown).

Here, the basic software set stored in each server is a minimum set of software, such as an operating system or display software, downloaded to and executed on the network terminals 107a to 107n to make it possible to remotely operate the application software in the server from the network terminals.

The configuration of the basic software set stored in each server may be appropriately determined taking into account the memory size and the convenience of use of the network terminals 107a to 107n.

The individual basic software sets are stored in the servers in a compressed state by a reversible method (GZIP, for example) and sent to the network terminals in the compressed state when they are downloaded.

The network terminals 107a to 107n have the same hardware configuration designed to store a plurality of different basic software sets. They are not equipped with a large-capacity storage device such as a hard-disk drive for storing application software such as a word processing program, database program, or other software for business use.

Figure 2:
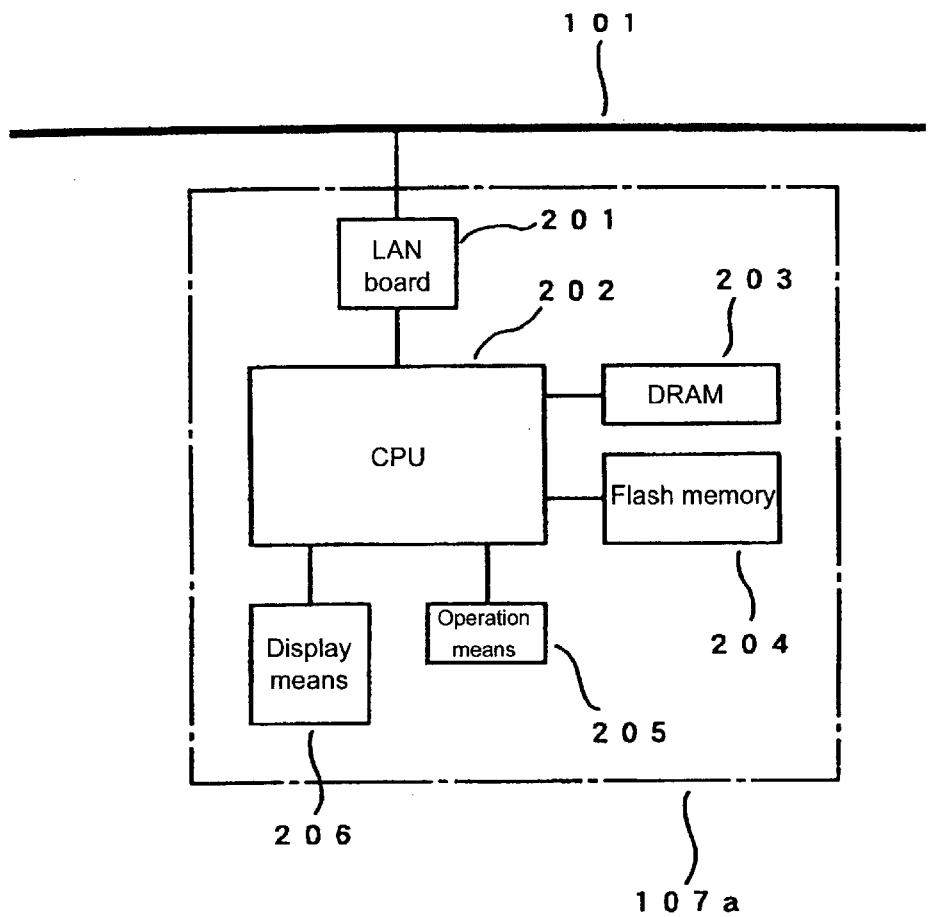
FIG. 2 is a block diagram of an embodiment of the network terminal of the present invention shown in FIG. 1.

FIG. 2 is a detailed block diagram of the network terminals 107a, shown as representative, since the network terminals 107a to 107n have the same hardware configuration.

The network terminal 107a has a LAN board 201, a CPU (Central Processing Unit) 202, a DRAM (Dynamic Random Access Memory) 203 as the second memory, a flash memory 204 as the first memory, operation means 205 including a keyboard, mouse and other devices, and a display means 206 which may be a CRT or LCD. The network terminal 107a is connected to the transmission medium 101 via the LAN board 201.

The DRAM 203, along with the CPU 202, is preferably fast enough for data exchange with the servers and for display on the display means. The flash memory 204 is used for storing the loader and a plurality of basic software sets downloaded from the servers, and hence the speed required for the DRAM 203 is not required here.

Instead of DRAM 203, other types of high-speed read-write memory can be used.

Although flash memory is suited for the first memory for storing the loader and the basic software sets downloaded from the servers because it can retain the contents when the power is removed and electrically rewritable, other types of nonvolatile memory or battery-backed-up volatile memory can also be used for the first memory instead of the flash memory 204.

The network terminal 107a does not have a hard-disk drive for storing the application software because the application software is not executed on the network terminal 107a. The application software is executed on the servers 102 to 105 by remote operation from the network terminal 107a.

Figure 3:
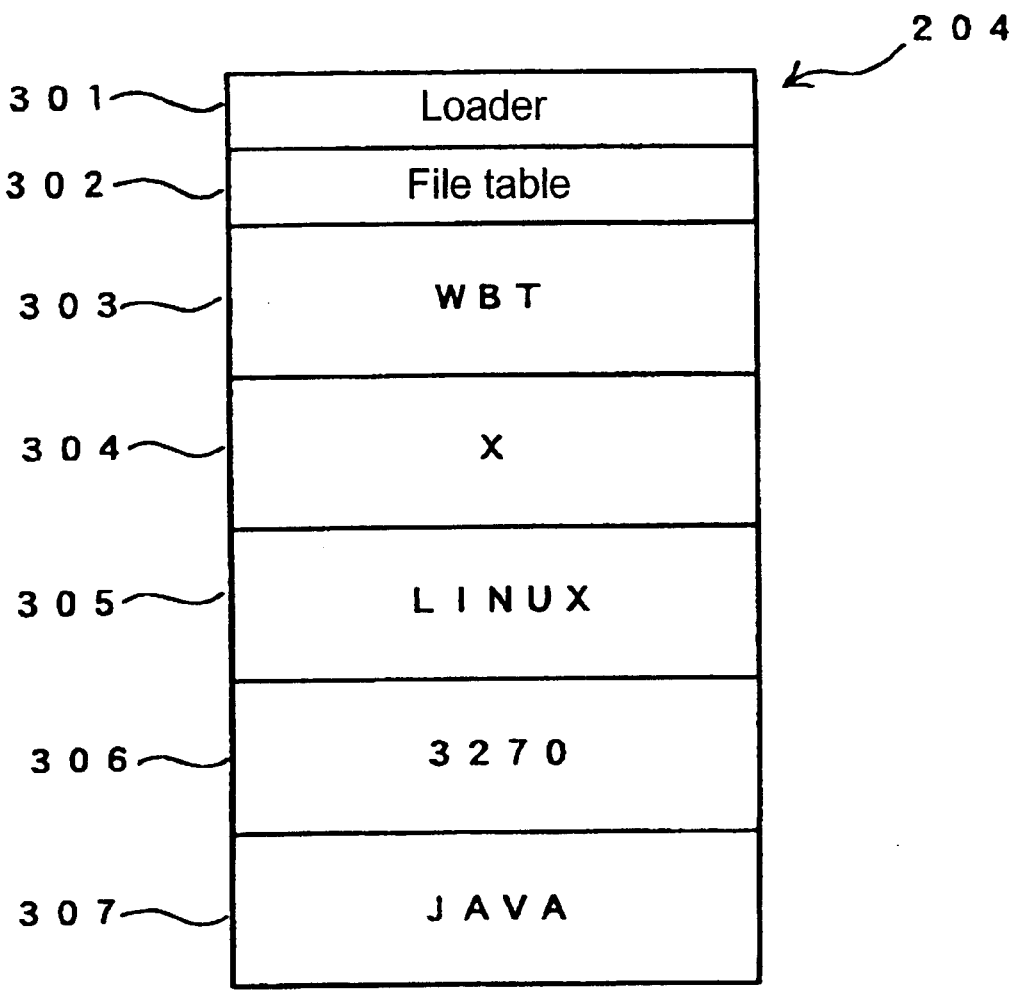
FIG. 3 shows a memory map of the nonvolatile memory of the network terminals shown in FIG. 2.

FIG. 3 shows the memory map of the flash memory 204. The flash memory 204 is divided into two memory areas: one for storing the loader 301 and a file table 302 and another for storing a plurality of basic software sets downloaded from the servers.

The loader 301 is a set of basic control software for the network terminal originally stored in the flash memory 204 which performs the basic functions such as receiving the basic software sets downloaded from the servers and storing them in the flash memory 204 (or DRAM 203); loading one of the basic software sets stored in the flash memory 204, determined according to a predetermined method or selected by a predetermined operation of the operation means, into the DRAM 203 and running it; allowing the selection of one of the basic software sets stored in the flash memory 204 or DRAM 203; deleting the basic software sets stored in the flash memory 204 one by one; decompressing a selected basic software set stored in the flash memory 204; writing into the file table 302 information indicating the basic software set being executed just before the power is switched off; allowing the designation of a basic software set for the default and writing into the file table 302 information indicating the designated basic software set; formatting the flash memory 204; and allowing the selection of the flash memory 204 or DRAM 203 for the download destination.

FIG. 3 shows an example in which five different basic software sets are stored in the area of the flash memory 204 for storing the basic software sets downloaded from the servers. These five basic software sets are a basic software set for a WBT 303, a basic software set 304 for an X terminal, a basic software set 305 for a Linux terminal, a basic software set 306 for an IBM 3270 terminal, and a basic software set 307 for a Java terminal.

The basic software set for a WBT 303 consists of Windows CE and RDP. The basic software set for an X terminal 304 consists of the Linux kernel and X Window. The basic software set for a Linux terminal 305 consists of the Linux kernel and the NFS (Network File System) protocol for connection with the server. The basic software set for a 3270 terminal (dumb terminal) 306 consists of Windows CE and the display program for a 3270 terminal. The basic software set for a Java terminal 307 consists of the kernel, VM (Virtual Machine) software, and applets.

There is no need to download all of these five basic software sets shown in FIG. 3 to all network terminals 107a to 107n. Only the basic software sets that may be used on each network terminal are adequate for the purpose.

Next, the operation of the above-described network and network terminals is described below. The operation to download a basic software set to the network terminals 107b to 107n is first described.

By operating each server, the basic software set stored in the server is downloaded by sending it to the network terminals in the compressed state. This download of the basic software set from each server can be made only to the network terminals designated on each server by the network terminals' MAC (Media Access Control) address. It is also possible to download the basic software set from each server to all network terminals 107a to 107n simultaneously by broadcast.

Further, it is possible to store all basic software sets on one site (host computer, for example) and download each basic software set from there to all network terminals by broadcast or only to network terminals designated by the MAC address on the site.

Furthermore, it is possible to download the necessary basic software sets to each network terminal by making download requests from each network terminal to the servers that have desired basic software sets stored in them.

The basic software sets downloaded in the network terminals 107a to 107n in this manner are stored in the flash memory 204 in the compressed state.

Information about the basic software sets stored in the flash memory 204 including their name, starting address and size is stored and retained in the file table 302 in the flash memory 204.

Next, the operation of the loader 301 to run one of the basic software sets stored in the flash memory 204 determined according to a predetermined method or selected by a predetermined selection operation of the operation means 205 is described below, using the network terminal 107a by way of example and referencing FIGS. 1 to 5. Here, it is supposed that five different basic software sets 303 to 307 are stored in the compressed state in the flash memory 204 of the network terminal 107a as shown in FIG. 3.

Figure 5:
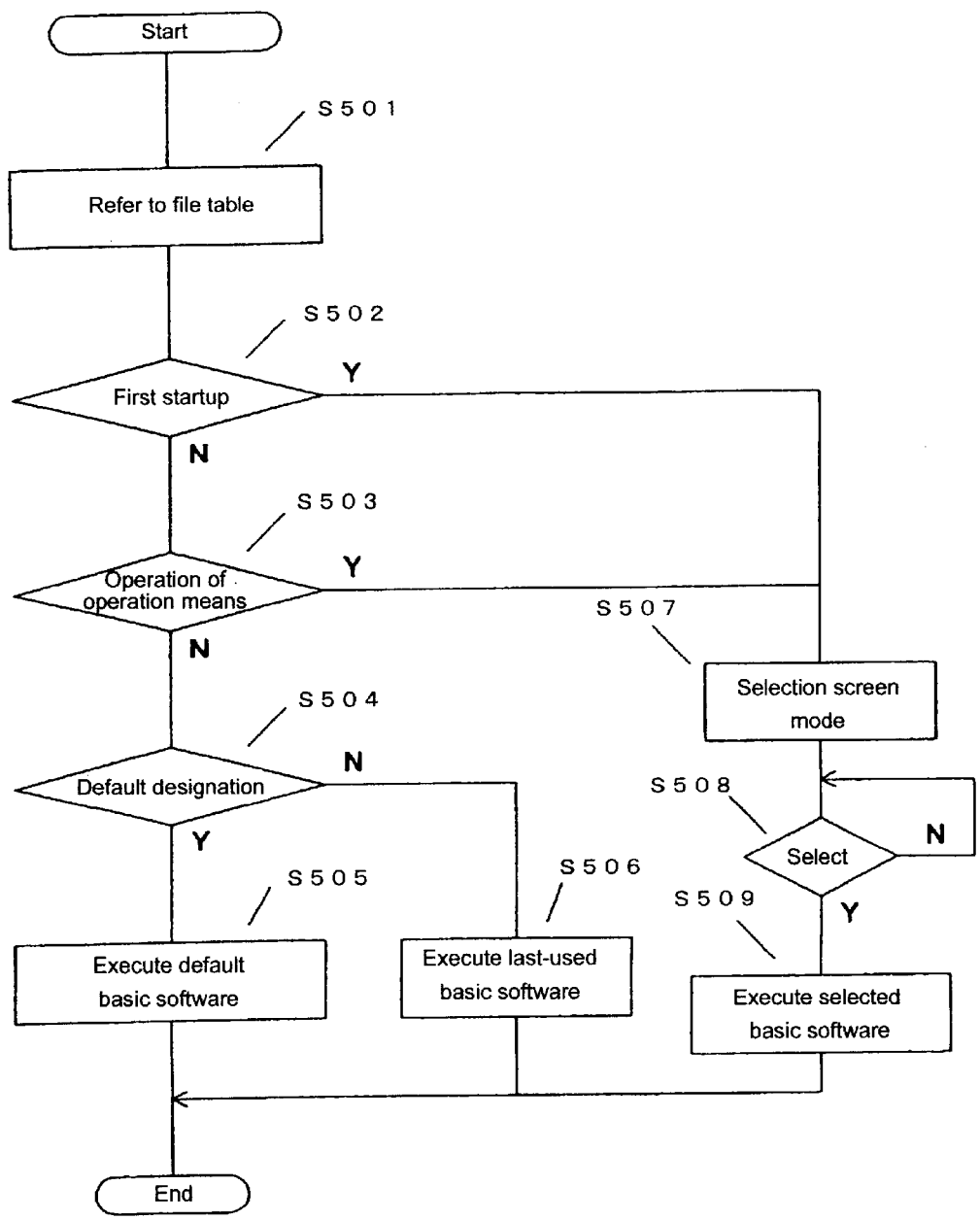
FIG. 5 is a flowchart showing the startup operation of the network terminals shown in FIG. 2.

When the network terminal 107a is switched on, the loader 301 stored in the flash memory 204 is executed. The loader 301 refers to the file table 302 (step S501) to check whether the startup is the first startup (step S502) as shown in FIG. 5. If the startup is the first startup, the loader 301 enters the selection mode which allows the selection of a basic software set to execute from the basic software sets stored in the flash memory 204 (step S507).

Figure 4:
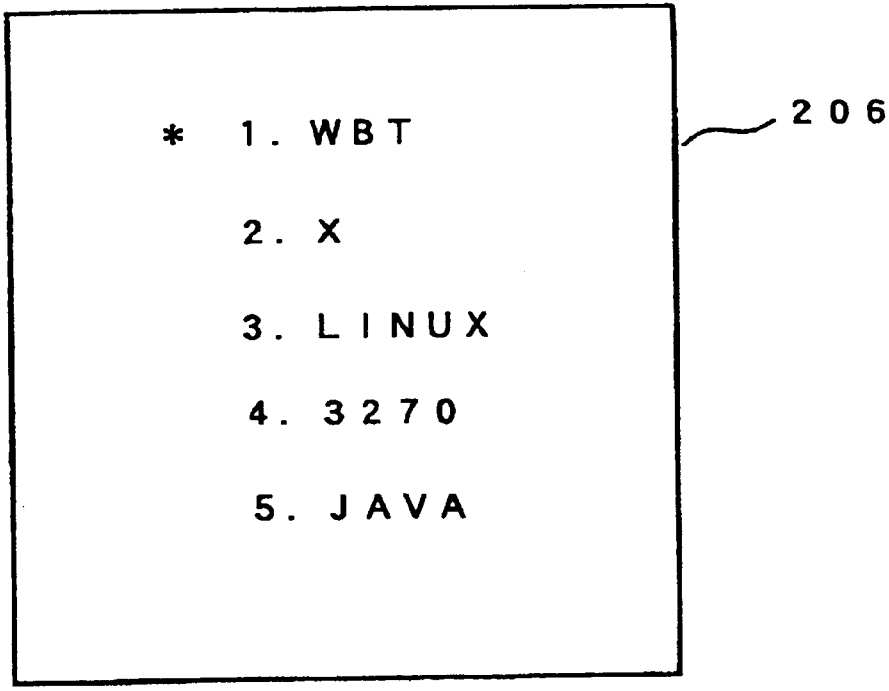
FIG. 4 is a flowchart showing the display of the selection mode of the network terminals shown in FIG. 2.

In the selection mode, the names of the basic software sets 303 to 307 in the flash memory 204, retained in the file table 302, are displayed on the display means 206 as shown in FIG. 4. The asterisk (*) shown in FIG. 4 is a mark used to indicate the default basic software set. Since no basic software set has been designated as the default at this stage, the asterisk is not displayed.

If one of the basic software sets is selected by a predetermined operation of the operation means 205 (step S508), the selected basic software set is decompressed by the decompressing function of the loader 301, loaded into the DRAM 203 and executed (step S509) therein.

The basic software set being executed in the DRAM 203 connects the network terminal 107a with the corresponding server via the transmission medium 101. It then becomes possible to use the application software in the server by remote operation.

For example, when the basic software set for a WBT 303 is selected, the basic software set 303 (that is, Windows CE and RDP software) is decompressed and loaded into the DRAM 203 and executed.

By the execution of the basic software set 303, the network terminal 107a is connected with the Terminal server 104 and prepared for use as a WBT. It then becomes possible to use by remote operation the word processing program, database program, or other programs for business use stored in the Terminal server 104.

Although the application program used is executed on the Terminal server 104, it can be operated as if it is being executed on the network terminal 107a.

The work with an application program is ended by saving the document or other data in the hard disk (not shown) of the Terminal server 104 and switch-off the network terminal 107a.

When the network terminal 107a is switched off, information indicating the basic software set being used just before the switch-off is written into the file table 302.

On the other hand, if the startup is not the first startup after the basic software sets are downloaded in the network terminal 107a in step S502 in FIG. 5, the loader 301 checks whether a predetermined operation of the operation means 205 has been carried out within a predetermined time from the switch-on (step S503).

If the predetermined operation has been carried out, the loader 301 enters the selection mode (step S507) and displays the selection screen shown in FIG. 4 on the display means 206. By selecting a desired basic software set with a predetermined selection operation of the operation means 205, the basic software set is loaded and executed in the DRAM 203 (steps S508 and S509).

Here, the predetermined time may be the time taken for the loader 301 to check the hardware configuration of the network terminal 107a or to perform the self-diagnosis from the switch-on, for example. Instead of operation of the operation means 205 within a predetermined time from switch-on, another method such as switching on the power while carrying out a predetermined operation of the operation means (holding down a predetermined key, for example) may also be used. Although there are many other methods that can be used to make the loader enter the above-described selection mode, operation of the operation means 205 related to switch-on, such as an operation carried out when the power is switched on or within a certain period after switch-on is preferable.

If the predetermined operation of the operation means 205 is not carried out within the predetermined time in step S503, the loader 301 refers to the file table 302 to check for the default basic software set (step S504).

If there is no basic software set designated for the default, the loader 301 runs the last-used basic software set (step S506). When the last-used basic software set is the basic software set for a WBT 303, for example, the basic software set 303 is decompressed and loaded into the DRAM 203, resulting in execution of the Windows CE and RDP software.

If a basic software set designated for the default in the file table 302 is found in step S504, the default basic software set is executed (step S505).

In the example shown in FIG. 4, the basic software set for a WBT 303 is designated as the default and marked with an asterisk. Hence, the basic software set for WBT 303 is executed.

In summary, if a network terminal is started up for the first time after basic software sets are downloaded, the loader 301 enters the selection mode and the basic software set selected by a predetermined operation is executed. If the startup is not the first startup, a predetermined operation of the operation means 205 is not carried out, and no basic software set is designated as the default, the last-used basic software set is executed. If the startup is not the first startup, a predetermined operation of the operation means 205 is not performed, and a basic software set is designated as the default, the default basic software set is executed. In addition, if the startup is not the first startup and a predetermined operation of the operation means 205 is carried out, the basic software set selected by a predetermined operation is executed.

Next, the procedure of designating a basic software set as the default (or changing the default basic software set) is described below.

By performing a predetermined operation of the operation means 205 within the predetermined time from switching-on, the loader 301 enters the selection mode and displays the selection screen shown in FIG. 4. The asterisk (*) shown in FIG. 4 is not displayed when no basic software set is designated as the default yet.

Here, any one of the basic software sets displayed in the selection screen can be designated as the default by a predetermined default-designating operation of the operation means 205. The operation may be to enter the numeral 1, 2, 3, 4, or 5 corresponding to the number assigned to the desired basic software set, for example.

Information indicating the default basic software set is written into the file table 302 by the default-designating function of the loader 301.

As a result, the asterisk (*) is displayed indicating the basic software set designated as the default. FIG. 4 shows the selection screen when the basic software set for a WBT is designated as the default. By thus designating a desired basic software set as the default, it becomes possible to automatically start up the network terminal with the basic software set by simply switching on the network terminal without need of any operation of the operating means 205.

Next, the operation of a server and the network terminals 107a to 107n to switch off the network terminals from a server is described below.

By a predetermined operation of the operation means of any one of the servers 107a to 107n or a predetermined server, a switch-off command is broadcast from the server to all the network terminals 107a to 107n.

Figure 6:
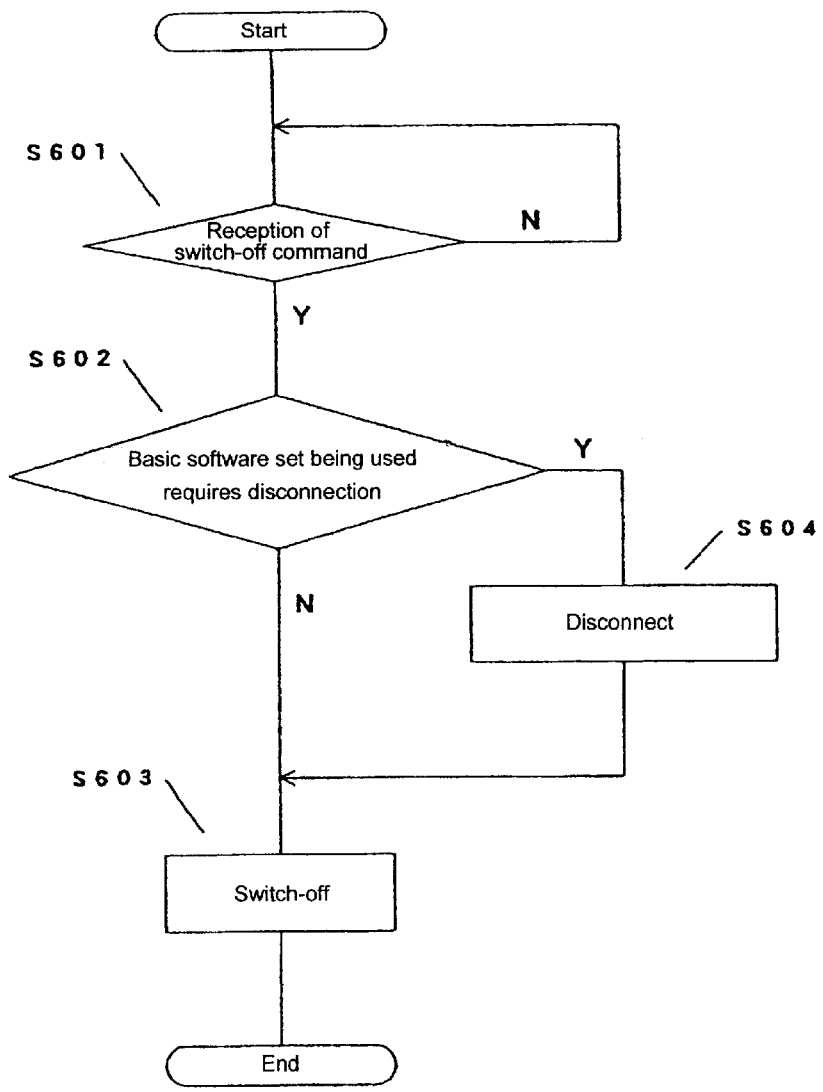
FIG. 6 is a flowchart showing the switch-off operation of the network terminals shown in FIG. 2.

Each network terminal checks whether the data received is a switch-off command as shown in FIG. 6 (step S601).

If the received data is a switch-off command, then the switch-off function of each network terminal checks whether the basic software set currently used on the network terminal requires severing its connection to the corresponding server before switch-off the network terminal (step S602).

A basic software set that requires disconnection prior to switch-off is one in which switch-off without severing the connection to the corresponding server before switch-off can cause problems. Some processes remain on the server and waste the resources of the server or a problem can occur at the time of reconnection.

For example, the basic software sets for an X terminal and Linux terminal require disconnection prior to switch-off, whereas the basic software sets for a WBT, 3270 terminal and Java terminal do not.

If it becomes known from the information about the basic software set currently used in the file table 302 by the check in step S602, that the basic software set being used requires disconnection before switch-off, the network terminal is disconnected from the corresponding server (step S604), and then the power is switched off (step S603).

If it becomes known in step S602 that the basic software set being used does not require disconnection before switch-off, then the power is switched off (step S603) without disconnecting the network terminal from the server.

Therefore, it becomes possible to switch off all network terminals simultaneously from a server without causing problems if some or all network terminals are using the basic software sets that can cause problems if the power is switched off without disconnection before switch-off. Further, it is also possible to quickly switch off the network terminals which are not using the basic software sets that require disconnection.

Although the switch-off function is built into the loader in the above embodiment, it is also possible to provide each network terminal with the switch-off function by including the appropriate switch-off function in each basic software set.

The network terminal for forming the network of the present invention preferably has a memory capable of storing a plurality of basic software sets downloaded from the servers and retaining the basic software sets when the network terminal is switched off, and loader software originally stored in the memory and performing functions including receiving a plurality of basic software sets downloaded from the servers and storing the basic software sets in the memory, and running one of the basic software sets stored in the memory determined according to a predetermined method or selected by a predetermined selection operation, as those in the above embodiment.

By using the network terminal, it becomes possible to quickly and easily provide each network terminal with a necessary basic software set without downloading it each time the network terminal is started or using the application software in a different server. In addition, the time and trouble to switch off the network terminals of a network having a large number of network terminals can be significantly reduced.

Further, the basic software set stored in each server can be downloaded from the server only to the network terminals designated by the network terminal's MAC address or broadcast simultaneously to all network terminals. Therefore, network management can be significantly simplified.

Obviously, numerous modifications and variations of the present invention are possible in light of the above teachings. It is therefore to be understood that, within the scope of the appended claims, the invention may be practiced otherwise than as specifically described herein.

What is claimed is:

1. A network system comprising:

at least one server having basic and application softwares, a network connected to the at least one server, a plurality of network terminals connected to the at least one server through the network, each of said network terminals functioning on the basic software downloaded from the server and operating the application software stored in the server, means for sending a switch-off command to the network terminals through the network, said means being installed in the at least one server, determining means installed in each of the network terminals for determining whether the basic software running on the network terminal requires the network terminal to be disconnected from the server before switching off a power of each of the network terminals, and switching off means electrically connected to the determining means for switching off the power of the network terminal and disconnecting the network terminal from the server upon receiving the switch-off command, said switching off means switching off the power of the network terminal after disconnecting the network terminal from the server when the determining means determines that the basic software requires the network terminal to be disconnected from the server before the power of the network terminal is switched off, said switching off means switching off the power of the network terminal without disconnecting the network terminal from the server when the determining means determines that the basic software does not require the network terminal to be disconnected from the server before the power of the network terminal is switched off.

2. The network system according to claim 1, further comprising a memory formed in each of the network terminals for storing the basic software downloaded from the server, said memory retaining the basic software after the power of the network terminal is switched off, and a loader software for performing functions including receiving the basic software from the server and storing the basic software in the memory, and running the basic software stored in the memory.

3. A network terminal connected to a server via a network for running a basic software, comprising:

determining means for determining whether the basic software running on the network terminal requires the network terminal to be disconnected from the server prior to switching off a power of the network terminal, and switching off means electrically connected to the determining means for switching off the power of the network terminal and disconnecting the network terminal from the server upon receiving a switch-off command from the server, said switching off means switching off the power of the network terminal after disconnecting the network terminal from the server when the determining means determines that the basic software requires the network terminal to be disconnected from the server before the power of the network terminal is switched off, said switching off means switching off the power of the network terminal without disconnecting the network terminal from the server when the determining means determines that the basic software does not require the network terminal to be disconnected from the server before the power of the network terminal is switched off.

4. The network terminal according to claim 3, further comprising a memory for storing the basic software downloaded from the server and retaining the basic software after the power of the network terminal is switched off, and a loader software stored in the memory for performing functions including receiving the basic software from the server and storing the basic software in the memory, and running the basic software stored in the memory according to a predetermined method or selection by a predetermined selection operation.

5. The network terminal according to claim 4, wherein said memory for storing the basic software downloaded from said server is a flash memory.

* * * * *